Patented Aug. 24, 1954

2,687,439

UNITED STATES PATENT OFFICE 2,687,439

HYDROTROPIC EXTRACTION OF ALCOHOL

Philip James Garner, Hooton, Wirral, Philip Alan Winsor, Great Sutton, and Ernest Colin Lumb, Wimbledon Park, London, England, assignors to Shell Development Company, San Francisco, Calif., a corporation of Delaware No Drawing. Application February 2, 1950,
Serial No. 142,093

Claims priority, application Great Britain
February 15, 1949

9 Claims. (Cl. 260—643)

This invention relates to the separation of mixtures of polar organic compounds or mixtures thereof with hydrocarbons. More particularly, this invention relates to the separation of components of mixtures of oxygenated aliphatic organic compounds or of mixtures thereof with hydrocarbons.

Recently numerous methods for the preparation of oxygenated aliphatic organic compounds have been developed and are now operated on a commercial scale. Many of the methods produce the desired products in substantially pure form or in such mixtures that their separation by conventional means is comparatively simple. Other methods, however, are less selective and yield complex mixtures from which the separation of oxygenated aliphatic organic compounds and the isolation of the pure components thereof is exceedingly difficult. For example, the so-called Fischer-Tropsch process, wherein carbon monoxide and hydrogen are reacted in the presence of a suitable catalyst, can be operated under certain operating conditions of temperature, pressure, etc. to produce large quantities of oxygenated compounds as well as straight-chain hydrocarbons, saturated and unsaturated, of widely varying molecular weights. In the operation of this process two layers which contain the products are formed, a water layer containing the lower molecular weight oxygenated compounds (e. g., acetone, methyl ethyl ketone, acetaldehyde, butyraldehyde, ethanol, butanol, acetic acid, butyric acid, etc.) and a hydrocarbon layer containing the relatively higher molecular weight oxygenated compounds (e. g., n-hexyl alcohol and the higher aliphatic alcohols, acids, aldehydes, ketones, etc.).

It will be obvious to those skilled in the art that the separation of the oxygenated compounds and the isolation of a particular oxygenated compound from such a complex mixture as is contained in the hydrocarbon phase would be exceedingly difficult by any of the presently known methods. Direct fractional distillation of the hydrocarbon phase is not feasible because of the numerous multi-component azeotropes that are known to exist among the various constituents and because of the tendency of certain of the compounds to react, decompose or polymerize when such a mixture is exposed to elevated temperatures for considerable periods of time. As a result the recovery of these oil-soluble oxygenated compounds on a large scale has been considered virtually impossible and commercially impractical and serious consideration has been given to the conversion or destruction of these compounds by means of solid catalysts at high temperatures to produce a liquid hydrocarbon product suitable for use as a motor fuel. Nevertheless, the recovery of such materials is highly desirable since they are valuable organic chemicals for various applications.

A principal object of this invention, therefore, is to provide a method for separating and purifying mixtures of substantially water-insoluble oxygenated aliphatic organic compounds from mixtures comprising the same. Another object of this invention is to provide an improved means of separating the components of mixtures including a substantially water-insoluble oxygenated aliphatic organic compound and a hydrocarbon wherein, by reason of the boiling point relationship or some other relationship between one or more properties of the constituents of the mixture, separation is difficult by usual means, such as distillation and the like. A further object of the invention is to provide a process for recovering oxygenated, substantially water-insoluble, aliphatic organic compounds, such as alcohols, aldehydes, ketones, ethers, esters and carboxylic acids from hydrocarbon solutions thereof and in particular from hydrocarbon solutions resulting from the oxidation of hydrocarbon material or from the hydrogenation of oxides of carbon, in particular carbon monoxide. Other objects of the invention and its advantages over the prior art will be apparent from the following description.

In accordance with the present invention, it has now been discovered that substantially water-insoluble oxygenated aliphatic (open chain) organic compounds may be separated from mixtures containing the same by extraction with a hydrotropic solution. More specifically, it has now been found that substantially water-insoluble oxygenated aliphatic organic compounds may be separated from mixtures containing the same by extraction with an aqueous solution of a water-soluble salt of a non-aromatic alkanesulfonic acid (straight, branched, or closed chain). Even more specifically stated, the present invention comprises the separation of mixtures of said oxygenated organic compound and a hydrocarbon (in which mixtures by reason of the relationship of certain properties of the constituents thereof separation by usual methods are difficult), by extraction with an aqueous solution of an alkali metal salt a non-aromatic alkanesulfonic acid.

The substantially water-insoluble oxygenated aliphatic organic compounds which may be separated according to the process of the invention can contain other substituent polar groups other than those only arising because of the presence of oxygen atoms; these other polar substituent groups may be radicals containing nitrogen, sulfur, phosphorus or halogen atoms. The process of the invention is applicable also to the separation of substantially water-insoluble oxygenated aliphatic organic compounds containing only carbon, hydrogen and oxygen (oxy-hydrocarbons), especially such compounds as are normally present in the hydrocarbon phase of the products derived from the so-called Fischer-Tropsch, Oxo, Synthol and allied processes. Moreover, the process of the invention is especially valuable for the separation of substantially neutral and substantially water-insoluble oxygenated aliphatic organic compounds containing only carbon, hydrogen and oxygen atoms such as aldehydes, ketones, ethers, esters and alcohols and particularly such above-described compounds as are produced by the Fischer-Tropsch, Oxo and allied processes.

The selection of a suitable hydrotropic solution for best results depends to some extent upon trial experiments in each individual case. The following considerations, however, will serve as a general guide. Other factors being the same, an oxygenated aliphatic organic compound is less soluble in the hydrotropic solutions according to the invention as:

(a) The further down the sequence hydroxyl, carboxyl, carbonyl, ester, ether, its polar group occurs, (b) The further from the end of a carbon chain the polar group is situated, and (c) The greater the molecular weight of the compound.

The choice of a hydrotropic solution will also depend to some extent on the degree of purity desired in the extract and in the raffinate and on the relative proportions of the constituents in the original mixture to be separated. In general the less hydrotropically soluble the compound which it is desired to extract, the higher the molecular weight and/or the greater the concentration of the hydrotropic salt in solution that is necessary to obtain a given extract/extractant ratio. It is to be understood, of course, that for certain purposes it may be preferable to employ a solution of a mixture of various hydrotropic salts rather than of only one particular salt.

With hydrotropic salts of higher molecular weight, however, the selectivity of extraction is reduced and difficulties of phase separation due to the formation of emulsions arise. In the process of the present invention it is, therefore, preferred to use a highly concentrated solution of a hydrotropic salt of relatively low molecular weight (containing fewer carbon atoms) rather than a more dilute solution of a constitutionally similar salt of relatively high molecular weight (containing a greater number of carbon atoms). Hydrotropic salts which have proved to be particularly effective in the process of the invention as showing a high degree of selectivity coupled with a high extract/extractant ratio are the alkali (metal) salts of the lower alkane (alkyl)-sulfonic acids where the alkyl group contains from 3 to 8 carbon atoms, inclusive (straight or branched). It is also contemplated that salts formed from the various organic bases, particularly the quaternary ammonium bases, are also effective hydrotropic salts when employed in the process of the invention. In general it has been found that aqueous solutions containing from 30 to 80% by weight of alkali metal salts of alkanesulfonic acids are suitable as hydrotropic solutions in the practice of the invention. It has, however, been found that aqueous solutions containing between 50 and 70% by weight of the hereinabove described salts, are particularly applicable and effective in the separation of mixtures of oxygenated aliphatic organic compounds.

It should be noted that when the oxygenated aliphatic organic compound mixtures include an acid the use of alkanoic acid salts as hydrotropic salts is at times undesirable since partial decomposition of these salts may occur; the alkali (metal) salts of the lower alkane-sulfonic acids are not, however, affected and are, therefore, preferable for the extraction of acid organic compounds.

A process for the separation of a mixture of two or more oxygenated aliphatic organic compounds as hereinbefore described may be carried out by feeding the mixture to a stage near the middle stage of an extraction battery (column) having a plurality of stages (plates) and supplied at one end with a hydrotropic solution as hereinbefore described and at the other end with a liquid hydrocarbon as a second process solvent, the hydrotropic solution and the hydrocarbon being mixed and then allowed to separate at each stage (plate). By this method the hydrotropic solution extracts the more hydrotropically-soluble organic compound or compounds and the hydrocarbon retains the less hydrotropically soluble compound or compounds. The hydrocarbon solvent employed is preferably chosen to have a boiling point such that easy separation from the organic compound or compounds dissolved therein is possible. Furthermore, where two or more organic compounds as described above are to be separated from each other and the hydrocarbon to be used is subject to choice, it is generally desirable to choose a hydrocarbon of high molecular weight which is a relatively poor solvent for the less hydrotropically soluble organic compounds which are accordingly later more easily removed from the hydrocarbon solvent.

A hydrocarbon phase containing oxygenated aliphatic organic compounds dissolved therein, such as is obtained according to the above-described process of the invention or from the Fischer-Tropsch, Oxo, etc. processes, may be treated with a solution of the same hydrotropic salt as employed in said above-described process of the invention under different or the same conditions of concentration and temperature or with a different hydrotropic solution, dependent upon the source of the hydrocarbon phase to effect separation and isolation of oxygenated aliphatic organic compounds dissolved therein.

Modification of the hydrotropic effect of a given salt of the invention may also be achieved (other than by varying conditions of temperature, pressure and concentration) by adding inorganic salts, preferably salts of an alkali metal and a mineral acid, such as sodium chloride or sodium sulfate, to the hydrotropic solution employed. The addition of these salts has a similar effect as the increase of concentration or of molecular weight of the hydrotropic salt.

Similarly, the extract phase resulting from the hydrotropic extraction of the above-mentioned hydrocarbon phase may be further extracted, which further extraction may also include the addition of an inorganic salt. The extract phase may also be washed with a hydrocarbon of a different boiling range from that of the extracted organic compounds from which the hydrocarbon may then finally be separated by distillation.

The efficacy of the use of hydrotropic solutions of the hereinbefore described salts, according to the invention is illustrated by data in the table, which contains particulars of experiments on the extraction of a 2-component mixture of aliphatic hydrocarbons with a primary alcohol containing 8 carbon atoms in the molecule utilizing a concentrated aqueous solution of potassium n-butanesulfonate. A mixture was made from the volumes shown in columns 2 and 4 of the alcohol specified in column 1 and of the hydrocarbons specified in column 3, where distillate B is an aromatic-free petroleum distillate of boiling range 188–213° C., $d_{20}^4$ 0.777 and $n_{20}^D$ 1.432. The mixture was separated by a countercurrent extraction of the number of theoretical stages shown in column 7 with a volume (column 6) of the extractant solution specified in column 5, yielding a volume (column 8) of hydrocarbon containing a proportion by volume of alcohol shown in column 9 and a volume (column 10) of extract layer containing a volume (column 11) of extract; the extract contained the proportion by volume of alcohol shown in column 12, the remainder being hydrocarbon; the recovery of alcohol is given in column 13. As can readily be seen, an almost theoretical recovery of alcohol is obtained.

We claim as our invention:

1. The process of separating octanol-1 from a non-aromatic hydrocarbon distillate solution thereof which comprises contacting said solution with an aqueous potassium n-butane sulfonate solution containing 70% by weight of potassium n-butane sulfonate, dissolving at least a portion of said octanol-1 therein and separating said aqueous potassium n-butane sulfonate solution.

2. The process of separating a substantially water-insoluble aliphatic alcohol containing only carbon, hydrogen and oxygen from a hydrocarbon solution thereof which comprises contacting said solution with an aqueous alkali metal salt solution of an alkane-sulfonic acid having from 3 to 8 carbon atoms, inclusive, said salt solution containing from 30% to 80% by weight of said alkali metal salt, dissolving at least a portion of said alcohol therein and separating said aqueous salt solution containing dissolved alcohol from the remaining material.

3. The process according to claim 2 wherein the alkali metal salt solution is a potassium salt solution.

4. The process of separating a substantially water-insoluble aliphatic alcohol containing only carbon, hydrogen, and oxygen and having 8 carbon atoms in the molecule from a substantially non-aromatic hydrocarbon distillate solution thereof which comprises contacting said solution with an aqueous potassium n-butanesulfonate, containing from 50% to 70% by weight of said potassium n-butanesulfonate, dissolving at least a

*Table*

| 1 | 2 | 3 | 4 | 5 | 6 | 7 | 8 | 9 | 10 | 11 | 12 | 13 |
|---|---|---|---|---|---|---|---|---|---|---|---|---|
| Alcohol or ketone (I) | Vol. (ml.) | Hydrocarbon | Vol. (ml.) | Extractant | Vol. of 5 (ml.) | No. of stages | Vol. of residue (ml.) | Percent of 1 in residue | Vol. of extract layer (ml.) | Vol. of extract (ml.) | Percent of 1 in extract | Percent recovery of 1 |
| octanol-1 | 25 | dist. B | 225 | 70% wt./wt. aqueous potassium n-butane sulphonate. | 100 | 4 | 212 | 0.1 | 138 | 38 | 66 | 99.0 |

The process of the invention may readily be adapted to provide a simple and convenient method of purifying or fractionating mixtures of organic compounds by selective extraction with hydrotropic solutions. This is of particular value, for example, in the preparation of organic compounds from olefins obtained in the petroleum industry by thermal or catalytic cracking of high molecular compounds such as paraffin wax. The olefins thus obtained are largely alkenes-1 but a small percentage of alkenes-2 and other alkenes is also present with the result that any derivatives prepared even from carefully fractionated products of such cracking processes are rarely single compounds. Further, even if a pure alkene-1 is used as starting material, under the influence of acids and other catalytic materials, there is a tendency for the double bond to shift from its terminal position in the carbon chain so that any derivatives prepared are again mixtures.

Application of the process of the invention to the products of the Fischer-Tropsch, Oxo, Synthol and allied processes renders readily and cheaply available quantities of substantially pure primary aliphatic alcohols, secondary alcohols and ketones which are of value as solvents, plasticisers and in the synthesis of organic compounds. The normal primary alcohols are of particular value in the production of the synthetic ester type lubricants and fatty acids for conversion to soaps.

portion of said alcohol therein and separating said aqueous potassium n-butanesulfonate solution containing dissolved alcohol from the hydrocarbon distillate.

5. The process of separating a substantially water-immiscible alcohol prepared by the Oxo synthesis from a mixture of the products of said Oxo synthesis which comprises extracting said mixture with an aqueous solution containing at least 30% of an alkali metal salt of an alkyl sulfonic acid, whereby at least a portion of said alcohol is dissolved in said aqueous salt solution, separating said aqueous salt solution containing dissolved alcohol from the remaining material and recovering the alcohol from said aqueous salt solution.

6. The process of separating a substantially water-immiscible alcohol from a hydrocarbon solution thereof which comprises, extracting said mixture with an aqueous solution containing at least 30% of an alkali metal salt of an alkyl sulfonic acid, whereby at least a portion of said alcohol is dissolved in said aqueous salt solution, separating said aqueous salt solution containing dissolved alcohol from the remaining material, and recovering the alcohol from said aqueous solution.

7. The process of separating a substantially water-immiscible alcohol from a hydrocarbon solution thereof which comprises, extracting said mixture with an aqueous hydrotropic solution of an alkali metal salt of an alkanesulfonic acid, whereby at least a portion of said alcohol is dissolved in said aqueous salt solution, separating said aqueous salt solution containing dissolved alcohol from the remaining material, and recovering the alcohol from said aqueous salt solution.

8. The process according to claim 7, wherein the alkanesulfonic acid contains from 3 to 8 carbon atoms, inclusive.

9. The process according to claim 7, wherein the alcohol is a primary aliphatic alcohol.

References Cited in the file of this patent

UNITED STATES PATENTS

| Number | Name | Date |
|---|---|---|
| 2,497,967 | Wadley | Feb. 21, 1950 |
| 2,522,619 | Harban et al. | Sept. 19, 1950 |